Jan. 16, 1962  M. EULE  3,016,738
MEANS FOR SUPERVISING THE HEAT DEVELOPMENT AND HEAT TRANSFER
IN BOILERS, FURNACES AND HEAT CONSUMERS
Filed Sept. 27, 1955  2 Sheets-Sheet 1
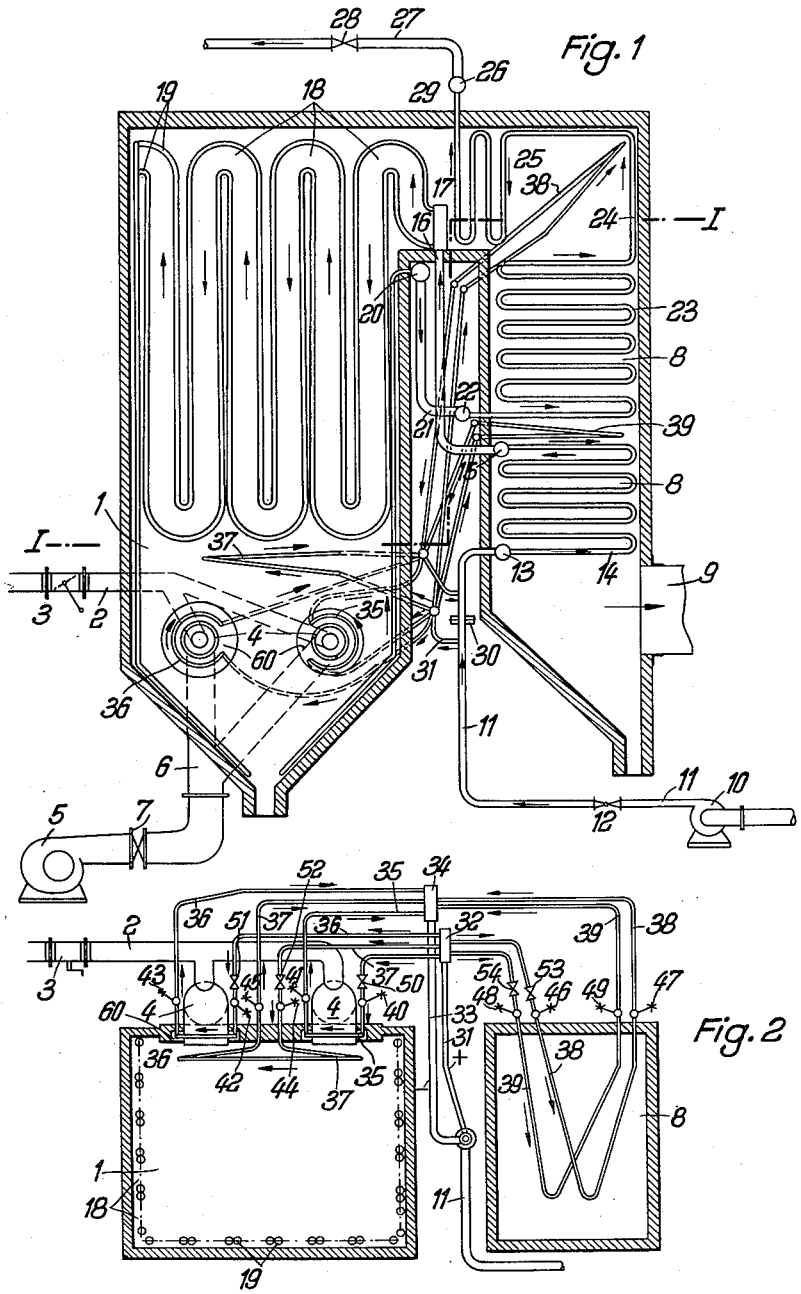

United States Patent Office 3,016,738
Patented Jan. 16, 1962

3,016,738
MEANS FOR SUPERVISING THE HEAT DEVELOPMENT AND HEAT TRANSFER IN BOILERS, FURNACES AND HEAT CONSUMERS
Martin Eule, 42 Bruderstrasse, Berlin-Spandau, Germany
Filed Sept. 27, 1955, Ser. No. 536,937
10 Claims. (Cl. 73—112)

The invention relates to the provision for boilers, furnaces and heat consumers of a supervisory or control gear with which it is possible directly to read off the heat development and heat transfer. On the basis of the indication of such a control gear operating with so-called "heat-probes," or heat exchangers the heat liberated in the combustion chamber, for example, with steam generators, has to be quickly brought into conformity with the heat conducted away in the steam, and the heat of combustion with smelting furnaces has to be quickly made to conform to the heat required for the material to be melted. Where the supply of heat is effected by combustion, the control gear has to facilitate the most economical adjustment of the fuel-air mixture.

With the solution of this problem in accordance with the invention, use is made of a measuring fluid current, for instance of liquid or gas tapped from the current of operating medium and proportional to the latter, or of a liquid or gas measuring current supplied by a separate pump. The invention includes the provision that the measuring line carrying the measuring current is subdivided into a plurality of parallel-connected component lines provided with throttle members for adjustment of the amount of measuring fluid current, the individual measuring lines being so arranged at different points of the boiler, furnace or heat consumer that they are able to serve for establishing the total heat absorption, the heat absorption and the heat comparison at different points and with different heat consumers, as well as the most favorable fuel-air ratio.

The tapping and collecting points of the parallel lines are at the same pressure and the same temperature at the admission side, and at the same pressure on the outlet side. The difference values formed from the temperature measurement values at the inlet and outlet serve as control and comparison heat values. The effective pressure producing the flow in the parallel measuring lines is either produced by a throttling point between the tapping and collecting points of the operating medium used, or by a separate pump; in the first case, a flow quantity proportional to the flow of operating medium is simultaneously assured in the measuring lines.

If burners are used for generating the heat, then the measuring lines disposed in the vicinity of the burners have to be so arranged that they absorb substantially only heat of radiation, while those located in the contact space, on the contrary, are so arranged that they absorb only heat of contact. The heat values determined electrically or mechanically, or by a combination of both methods, are used by addition for the control of the total heat supply, by subtraction or formation of a ratio for the control of the correct fuel-air mixture at separate burners or altogether and by formation of a ratio for establishing the loading of the burners relatively to one another or for comparison of the thermal loading with different operating currents. The heat values determined in the measuring lines may in a manner known per se be used for emitting impulses for regulating purposes.

A number of constructional examples are illustrated by way of example in the accompanying drawings in which:

FIGURES 1 and 2 show the application of the invention to a forced through-flow boiler, FIGURE 1 being a longitudinal section, and FIGURE 2 being a cross-section on the line I—I of FIGURE 1 through such a boiler;

Figure 3:
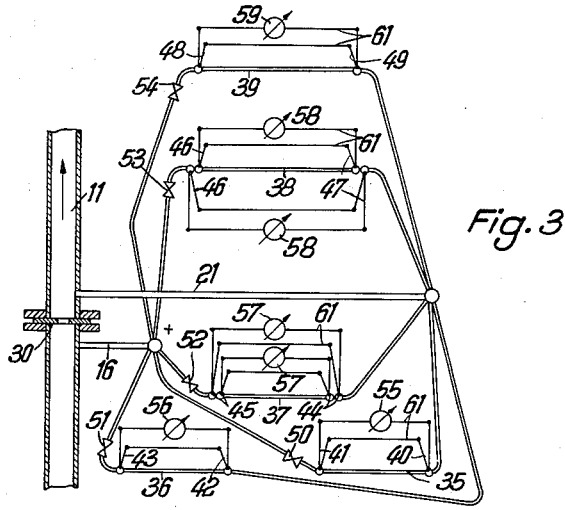
FIGURE 3 illustrates diagrammatically an arrangement of the measuring line sections equipped with thermo couples.

There will first be described the use of the invention in a forced through-flow boiler by reference to FIGURES 1 to 3. The boiler comprises a combustion chamber 1, into which the combustible gas, regulatable by the pipe 2 with the regulating valve 3, passes to the burners 4. The required amount of the air necessary for combustion is also fed to the burners 4 by means of the fan 5 and the pipe 6 through the slide valve 7. The combustion gases flow through the combustion chamber 1, which is only lined with tubes at the side walls, it being mainly heat of radiation which is given off. The gases then pass into the flue 8 which is completely filled with coils of tubes and in which heat of contact is given off, and they travel by way of the duct 9 to the chimney (not shown).

The feed water is supplied to the boiler by means of the feed pump 10 by way of the conduit 11 and the control valve 12. It then passes through the distributor pipe 13 into a plurality of preheater coils 14 disposed in juxtaposed relation in the flue 8 and leaves the said coils again through a collecting pipe 15. A collecting pipe 16 conducts the water through the distributor 17 to the strip-like pipe elements 18 lining the combustion chamber, the said elements consisting of a relatively large number of parallel pipes 19 connected directly one after the other. For the sake of clarity in FIGURES 1 and 2, only the outer pipes 19 of the pipe elements 18 are shown in these figures.

After the water, which is converted into steam in passing through the pipes, has flowed through pipe elements covering all the four walls, the mixture of steam and water passes through the collecting pipe 20, the connecting conduit 21 and the distributor pipe 22 into the residual vaporising coils 23 filling the upper flue gas shaft 8, in which coils the vaporisation is completed and the superheating already commences. From the coils 23, the steam passes through the pipes 24 into the final superheater, which also consists of a number of parallel-connected tubular coils 25 filling the space of the flue gas transfer point. By way of the collecting pipe 26, the conduit 27 and the shut-off valve 28, the steam is led to the consumer (not shown).

The arrangement of the measuring sections or heat exchangers can also be seen in FIGURES 1 and 2 and is carried out in the following manner: 30 represents a throttle flange (FIGS. 1 and 3) which is only indicated diagrammatically and which produces an effective pressure of about 3 kg. This effective pressure maintains the proportional relationship between the fluid current flowing through the measuring sections and the total heat quantity supplied to the boiler. As can be seen from FIGURE 2, the said pressure is conducted on the positive side through the pipe 31 to the distributor connection 32 and on the negative side through the pipe 33 to the collecting pipe or union 34. The measuring sections 35, 36 and 37 arranged in the combustion chamber 1 and also the measuring sections 38 and 39 disposed in the contact space 8 are branched off or tapped from the pipe connection 32. All the measuring sections are brought together again in the connection or union 34. Just ahead of the boiler inlet and just after the boiler outlet, the said sections in each case contain unions 40 to 49 for measuring the temperature, the arrangement in pairs of the said unions producing the heat value of the associated measuring section. For example, the temperature-measuring points 42 and 43 are associated with the measuring section 36.

For adjustment of the flow quantities, all the measuring sections contain valves 50 to 54. By means of these valves, the flow quantities are adjusted, and simultaneously connected therewith is an adjustment of the measurement level of the heat values. This setting is generally maintained without alteration and once the proportional relationship between the flow quantities in the boiler and in the measuring sections is adjusted, the said relationship is maintained thereby, even with changes in load. The disposition of the measuring sections is normally such that the associated flow quantity in each measuring section is only about ½% of the flow quantity through the boiler.

The measuring sections are arranged in the combustion chamber 1 in recesses of the boiler casing 60 so that they can satisfactorily absorb the radiated heat of the combustion zone to be measured without being contacted by the stream of flue gas itself and thereby being subjected to the danger of slagging. In addition, the measuring line 37, which is shown in FIGURE 2 horizontally arranged in the combustion chamber for the sake of clarity, is arranged in the boiler casing.

The temperature-measuring points may be equipped with mercury thermometers. It is, however, advantageous to fit them with thermo couples, perhaps with resistance elements. This has the advantage that then the measured heat values can be combined electrically in a particularly simple manner.

FIGURE 3 illustrates diagrammatically the paths of the measuring line section and the thermo couples. The temperature-measuring points 40 to 49 are fitted with thermo couples, which bear the same reference numerals as the associated measuring connections, even when several of them are provided. The thermo couples are so connected relatively to one another by the line 61 that only the difference of the measured temperature is indicated in the indicator instruments 55–59. This temperature value corresponds to that heat value measured by the measuring section and is thus a representation of the heat loading at this point within the boiler.

The evaluation of the measurement readings is explained by reference to the following example. The measuring instruments 55 to 59 are adapted to produce the following measurements at the boiler outlet with a boiler loading of 100 t./h., 100 atm. and 500° C.:

| | Measuring instrument | Measured value, mv. | | Measured value, mv. |
|---|---|---|---|---|
| Start of Measurement. | 55 | 20 | Conclusion of measurement after correction. | 20 |
| | 56 | 17 | | 20 |
| | 57 | 28 | | 30 |
| | 58 | 15 | | 13.5 |
| | 59 | 13 | | 12.5 |
| | | 93 | | 96 |

In order to establish the total loading, all the initial indicated values are added and, as indicated, a value of 93 mv. is obtained. For this value, 96 mv. are reached with the associated loading and the best setting. In order to establish the loading of the burners, the ratio of the indicated values of the measuring instruments 56 and 55 is formed from the initial values (which is readily possible in a bridge circuit) and there is obtained the value 17/20=0.85. This means that the burner loading in the region of the measuring instrument 56 is too low. In order to establish the correct fuel-air ratio, the ratio of the heat values in the radiation and contact space is formed and the value obtained for the ratio of the indicated values of the measuring instruments 55/58 is 20/15, which equals 1.33, while the ratio for the indicated values of the measuring instruments 56/58 is 17/15, which equals 1.13. For indicating the excess of air, use is made of the fact that with an increased excess of air, the heat supply in the contact section and thus also in the measuring section 38 increases, while the heat dissipation in the radiation section and thus also that at the measuring sections 35 and 36 decreases. Conversely, with a reduction of air, the heat dissipation in the measuring sections 35 and 36 increases, while the transfer to the measuring section 38 decreases.

The measurement values therefore indicate that the fuel supply is on the whole too low, which is obviously due to the deficient supply to that burner with which the measuring instrument 56 is associated. Consequently the supply of fuel to this burner will be increased and there are then obtained those final values of the measurement which are indicated above. For the fuel-air ratio, the value 20/13.5=1.38 is now produced for both burners. This value is also further increased for the burner with which the measuring instrument 55 is associated, since with a better fuel-air ratio, the heat value indicated by the measuring instrument 58 decreases. If complete conformity exists between supply and dissipation of heat, as is the case with the forced through-flow boiler, it is also possible to employ the true difference formation instead of the ratio formation. For example, the control of the burner loading is produced by the indicated value of the measuring instruments 55 and 56: 20 mv.—17 mv.=3 mv. and, after correction 20 mv.—20 mv.=0 mv. When measuring the excess of air, the indicated value of the instrument 58 is deducted from that of the instrument 55: 20 mv.—15 mv.=5 mv. In analogous manner, the value 17 mv.—15 mv.=2 mv. is obtained for the indicated values of the instruments 56 and 58. After effecting the correction, the values 20 mv.—13.5 mv.=6.5 mv. is produced for both, that is to say, they tend to reach an optimum value in both cases.

With drum-type boilers having a large storage volume, the heat supply is no longer equal to the heat dissipation. In this case the indicated method of summation of the heat values cannot be utilized for measuring the total heat supply. It is nevertheless also possible in this case to effect the comparison of the burner loading and also the establishment of the fuel-air ratio despite the fact that the relationship between the supply of operating medium and firing is not proportional, since then only heat value comparisons or the correct air supply are established by forming a ratio.

Figure 4:
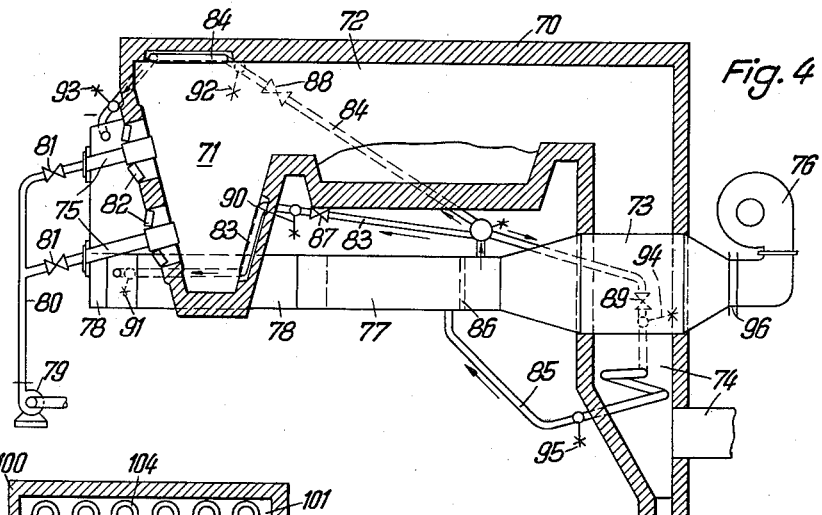
FIGURE 4 is a longitudinal section through a smelting furnace equipped with the control gear according to the invention.

The use of the measuring method is further illustrated by reference to the example of a smelting furnace 70 which is shown diagrammatically in FIGURE 4 and which is equipped with a combustion chamber 71, a smelting chamber 72, an exhaust gas air heater 73 and a flue gas discharge duct 74. The furnace is heated by the two oil burners 75 which receive the necessary air for combustion by way of the fan 76, the air heater 73 and the air ducts 77 and 78. The problem in this case consists in supplying the burners 75 with the necessary amount of oil through the oil pump 79, the pipe 18 and the valves 81. By means of the regulating valves 82, the correct amount of air is simultaneously supplied to the two burners. In this case, another measuring arrangement is used, with which the said measurement problems are solved by means of measuring sections 83, 84 and 85 fed with air. In this case, the air is withdrawn from the air duct 77 after the fan 76 and the throttle valve 96 and ahead of or after the air heater 73 and is returned to this duct again in front of the burners 75. The throttle flange 86, if desired, in conjunction with the resistance of the air heater 73, provides for the necessary proportional pressure drop in the free measuring sections through which the air flows. These latter have adjustment members 87, 88 and 89 for the first setting of the flow quantity. The measurement values are obtained at the measuring positions 90 to 95 and are utilised in the manner explained as heat values for measuring the total heat yielded, the burner loading and the fuel-air ratio.

Figure 5:
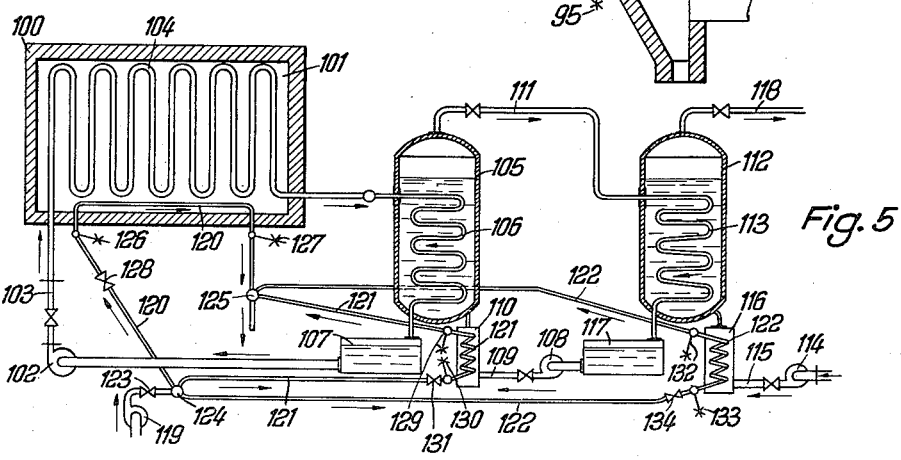
FIGURE 5 shows an atomic reactor serving to generate power.

As a last example of the use of the measurement arrangement, there is illustrated the application thereof in the comparison of different flows of heat quantities, such as may occur in many cases in the art but more especially with atomic reactors for generating power. This method of application is illustrated in FIGURE 5 as applied to an atomic reactor 100 in conjunction with a primary circuit, an intermediate circuit and a final circuit. In this case, the problem is generally for the final circuit, usually a steam circuit, to be protected against radio-activity by interposing circuits. The heat absorption in the individual circuits must be adapted as quickly as possible to the heat development of the reactor mass 101. This problem is solved as follows:

The heat evolution of the reactor mass 101 which takes place in the reactor 100 and which is controlled by devices (not shown) is forced by the operating medium, for example liquid sodium, circulating in the primary circuit, by way of the pump 102, the pipe 103 and the pipe system 104 to the evaporator 105 of the intermediate circuit. In the latter, the mixture gives off its heat to the liquid contained in the evaporator 105 through the pipe system 106. The mixture is collected in the container 107. The liquid of the intermediate circuit is supplied to the evaporator 105 by the pump 108 through the pipe 109 and the heat exchange measuring vessel 110 and is then evaporated in the evaporator 105. This vapour passes through the pipe 111 to the boiler 112, where it gives off its heat through the pipe system 113 to the water supplied by way of the feed pump 114, the pipe 115 and the heat-measurement vessel 116. The liquid of the intermediate circuit is collected in the vessel 117. The steam being formed is conducted through the pipe 118 to the consumer.

The measurement and comparison of the transmitted heat quantities in the three circuits is effected by means of a measuring tube system to which a suitable measuring liquid is supplied by the pump 119 and the pipe 123. Branching off from the distributor pipe 124 are the three measuring pipes 120, 121 and 122 and these are united again in the collecting pipe 125. The measuring liquid runs out from the latter. Incorporated in the measuring section 120 are the thermo-elements 126 and 127, while the valve 128 is provided for the first adjustment of the quantity of measuring liquid. In the same way, the measuring section 121 includes the thermo-elements 129 and 130 as well as the valve 131, while the measuring section 122 includes the thermo-elements 132 and 133 as well as the regulating valve 34. The extraction of the heat values and their comparison for regulating the three flows of liquid is effected in the same manner as that which has already been described.

I claim:

1. A measuring device, for determining the performance of a heat generating plant having a heat absorbing medium, comprising a plurality of heat exchangers adapted to be disposed at different locations in the plant, pressure generating means operable for passing a fluid through each heat exchanger, throttling means in each heat exchanger operable to adjust separately for each heat exchanger the flow of the fluid to be proportional to the flow at said location of said heat absorbing medium, whereby each heat exchanger will simulate the rate of heat consumption by said medium at each location, temperature differential measuring means intercommunicating with the inlet and outlet of each heat exchanger and operable to determine the rate of heat consumption of each heat exchanger, whereby the rates of heat consumption at the different locations in the plant may be indicated and compared.

2. In a device, as claimed in claim 1, said temperature differential measuring means including means for generating a value proportional to the heat consumption measured, said values admitting of computing to determine the overall heat consumption of said plant.

3. In a device, as claimed in claim 1, said heat exchangers comprising fluid carrying lines arranged in parallel.

4. In a device, as claimed in claim 1, said temperature differential measuring means comprising thermo couples.

5. In a device, as claimed in claim 1, said heat generating plant comprising a steam boiler including at least one burner and fuel supply and air supply lines for said burner, and control means interconnected to said temperature differential measuring means and operable in response to the combined indications obtained therefrom to adjust the amount of the fuel and air supplied to said burner for varying the heat output of said plant.

6. In a device, as claimed in claim 1, wherein said medium circulating through said plant is tapped and forms the fluid passed through said heat exchangers.

7. In a device, as claimed in claim 1, wherein the fluid passing through the heat exchangers is separate from and independent of said medium.

8. In a device, as claimed in claim 1, said plant comprising a steam boiler including at least one burner, a combustion chamber, said pressure generating means comprising a feed pipe for said medium having a restriction therein and including a branch pipe upstream of said restriction leading to said heat exchangers for supplying fluid in the form of said medium to said heat exchangers, and a return conduit from said heat exchangers leading to said feed pipe downstream of said restriction.

9. In a device, as claimed in claim 1, said heat generating plant comprising a smelting furnace including an air duct for supplying combustion air, said pressure generating means including a branch connection from said air duct upstream of a restriction leading to said exchangers, and connections leading from said heat exchangers to the air duct downstream of said restriction.

10. In a device, as claimed in claim 1, said plant comprising an atomic reactor in conjunction with primary, intermediate and final media circuits for transferring heat developed in said reactor to the medium in the final circuit, one of said heat exchangers being disposed in said reactor, in said intermediate circuit and in said final circuit, and said pressure generating means including means operable for supplying said fluid to said heat exchangers independent of said media circuits.

References Cited in the file of this patent
UNITED STATES PATENTS

| | | |
|---|---|---|
| 300,202 | Boulier | June 10, 1884 |
| 1,349,409 | Crawford | Aug. 10, 1920 |
| 1,430,731 | Earl | Oct. 3, 1922 |
| 1,640,801 | Peterson | Aug. 30, 1927 |
| 2,555,250 | Schroeder | May 29, 1951 |

FOREIGN PATENTS

| | | |
|---|---|---|
| 5,731 | Germany | Oct. 22, 1878 |
| 22,526 | Great Britain | 1914 |
| 667,171 | Great Britain | Dec., 1951 |

UNITED STATES PATENT OFFICE
CERTIFICATE OF CORRECTION

Patent No. 3,016,738 January 16, 1962

Martin Eule

It is hereby certified that error appears in the above numbered patent requiring correction and that the said Letters Patent should read as corrected below.

In the drawings, Sheet 2, in Fig. 3, for "16" read -- 31 -- and for "21" read -- 33 --; column 4, line 61, for "18" read -- 80 --.

Signed and sealed this 20th day of November 1962.

(SEAL)
Attest:

ERNEST W. SWIDER
Attesting Officer

DAVID L. LADD
Commissioner of Patents